(12) United States Patent
Miyamoto

(10) Patent No.: US 7,220,138 B2
(45) Date of Patent: May 22, 2007

(54) CARD CONNECTOR

(75) Inventor: Osamu Miyamoto, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/493,725

(22) Filed: Jul. 27, 2006

(65) Prior Publication Data

US 2007/0037425 A1 Feb. 15, 2007

(30) Foreign Application Priority Data

Aug. 10, 2005 (JP) ............................. 2005-232123

(51) Int. Cl.
*H01R 13/62* (2006.01)

(52) U.S. Cl. ...................... 439/159; 439/630

(58) Field of Classification Search ................ 439/159, 439/160, 630

See application file for complete search history.

(56) References Cited

U.S. PATENT DOCUMENTS

| | | | | |
|---|---|---|---|---|
| 6,095,868 | A * | 8/2000 | Hyland et al. | 439/630 |
| 6,261,113 | B1 * | 7/2001 | Chen | 439/260 |
| 6,561,851 | B2 * | 5/2003 | Florescu | 439/630 |
| 6,602,096 | B1 * | 8/2003 | Kronestedt et al. | 439/630 |
| 6,994,574 | B1 * | 2/2006 | Lai | 439/159 |
| 7,011,537 | B1 * | 3/2006 | Wu | 439/159 |
| 7,011,549 | B1 * | 3/2006 | Lai | 439/630 |
| 7,044,797 | B1 * | 5/2006 | Lai | 439/630 |
| 7,044,799 | B1 * | 5/2006 | Lai | 439/630 |
| 7,081,020 | B1 * | 7/2006 | Lee | 439/630 |
| 7,108,557 | B2 * | 9/2006 | Kikuchi et al. | 439/630 |
| 7,112,075 | B1 * | 9/2006 | Su | 439/159 |
| 2002/0160661 | A1 * | 10/2002 | Florescu | 439/630 |
| 2006/0154506 | A1 * | 7/2006 | Kikuchi et al. | 439/159 |
| 2006/0205279 | A1 * | 9/2006 | Pan | 439/630 |
| 2007/0004258 | A1 * | 1/2007 | Miyamoto | 439/159 |
| 2007/0004283 | A1 * | 1/2007 | Miyamoto | 439/630 |
| 2007/0049080 | A1 * | 3/2007 | Anzai et al. | 439/159 |
| 2007/0049081 | A1 * | 3/2007 | Anzai et al. | 439/159 |

\* cited by examiner

*Primary Examiner*—Ross Gushi
(74) *Attorney, Agent, or Firm*—Takeuchi & Kubotera, LLP

(57) ABSTRACT

A card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out. The card has an inclined surface at a middle of a side surface thereof in a width direction thereof. In the card connector, the ejection unit includes a plate portion and a pair of sidewalls extending from the plate portion. The sidewalls sandwich the card placed on the plate portion from both sides in the width direction of the card. At least one of the sidewalls includes an inclined surface corresponding to the inclined surface of the card.

7 Claims, 4 Drawing Sheets

CARD CONNECTOR

BACKGROUND OF THE INVENTION AND RELATED ART STATEMENT

The present invention relates to a card connector, and more specifically, to a card connector with an ejection mechanism of a push-push type. In the card connector of the invention, it is easy to insert a card.

Patent Reference 1 has disclosed a conventional card connector with an ejection mechanism of a push-push type. In such a card connector, a tray is disposed to eject outside the card connector for covering a bottom surface and side surfaces of a card, so that the card is inserted into the card connector. When the card is removed from the card connector, the tray is ejected again. In the conventional card connector, the tray holds substantially all of side surfaces of the card, and does not sandwich the card.

Patent Reference 2 has disclosed another conventional card connector with an ejection mechanism of a push-push type. In the conventional card connector, a card has an inclined surface having a width decreasing toward an insertion direction of the card. The inclined surface is provided at a middle of one of side surfaces in a width direction. An ejection force is applied to the inclined surface provided on one of the side surfaces, so that the card is discharged. The other side surface is pressed against an inner wall of a housing, thereby holding the card.

Patent Reference 1: Japanese Patent Publication No. 2000-148927

Patent Reference 2: Japanese Patent Publication No. 2005-108763

In the conventional card connector disclosed in Patent Reference 1, the tray is provided for covering a whole bottom surface and the side surfaces of the card. Accordingly, it is difficult to reduce a size of the tray, thereby increasing a size of the card connector.

In the conventional card connector disclosed in Patent Reference 2, the ejection force is applied on only one of the side surfaces of the card. Accordingly, when the card is ejected, the card tends to be inclined, thereby making it difficult to smoothly eject the card. Further, the inner wall of the housing receives the force applied to one of the side surfaces. Accordingly, it is difficult to hold the card within the card connector with a sufficient force.

In view of the problems described above, an object of the present invention is to provide a card connector capable of solving the problems in the conventional card connectors. That is, in the invention, it is possible to reduce a size of the card connector, and to hold a card with a sufficient force.

Further objects will be apparent from the following description of the invention.

SUMMARY OF THE INVENTION

According to the present invention, a card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out.

The card has an inclined surface having a width decreasing toward an insertion direction of the card at a middle of a side surface thereof in a width direction thereof. In the card connector, the ejection unit includes a plate portion extending in a width direction of the card and a pair of sidewalls extending from a bottom surface of the plate portion toward a bottom surface of the housing. The sidewalls sandwich the card placed on the plate portion from both sides in the width direction of the card. At least one of the sidewalls includes an inclined surface corresponding to the inclined surface of the card.

According to the present invention, one of the sidewalls may further include an extended surface extending in the direction that the card is inserted and pulled out in addition to the inclined surface.

According to the present invention, the extended surface may include two extended surfaces. The two extended surfaces may be arranged in parallel at an insertion side and a pulled out side of the card along the direction that the card is inserted and pulled out with the inclined surface in between.

According to the present invention, the extended surface disposed at the pulled out side of the card may include an abutting portion of the spring member and the ejection unit.

According to the present invention, the other of the sidewalls may include an elastic member for pressing the card against the one of the sidewalls.

According to the present invention, an elastic engaging member may be provided on the plate portion. When the card is inserted into the card connector, the card pushes the elastic engaging member to deform in a direction perpendicular to the direction that the card is inserted and pulled out and the width direction of the card.

According to the present invention, the plate portion may include a cut portion provided adjacent to the elastic engaging member in the direction that the card is inserted and pulled out.

DETAILED DESCRIPTION OF PREFERRED EMBODIMENTS

Hereunder, embodiments of the present invention will be explained with reference to the accompanying drawings. According to the present invention, a card connector is provided with an ejection mechanism. The ejection mechanism is a push-push type, in which it is possible to freely insert and pull out a card through pushing the card.

Figure 1:
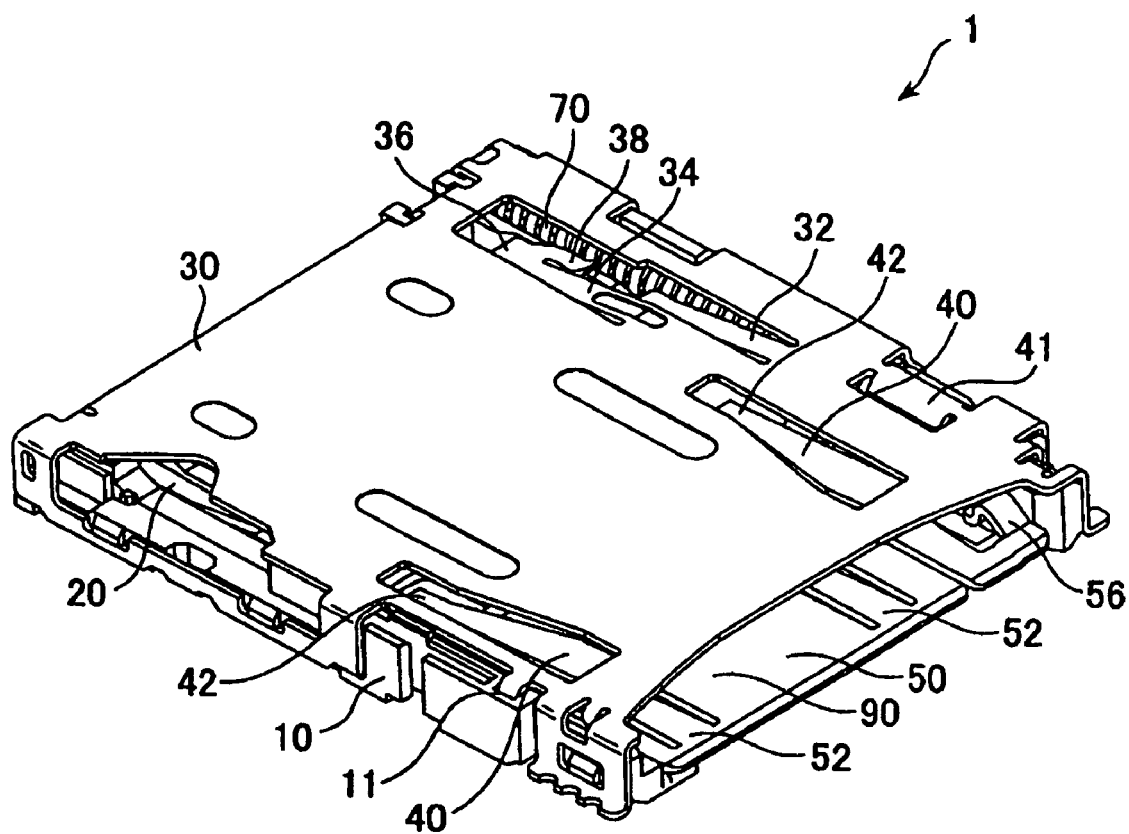
FIG. 1 is a perspective view showing a card connector according to an embodiment of the present invention.
Figure 2:
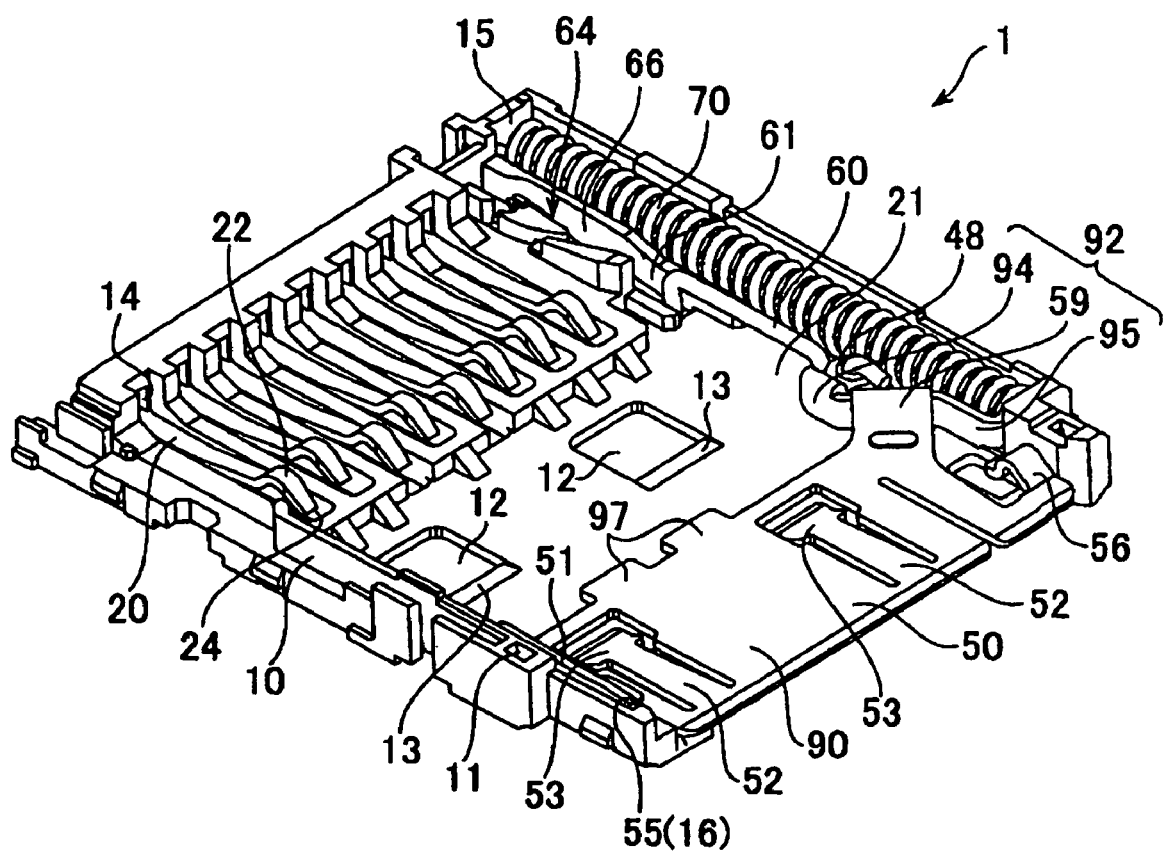
FIG. 2 is a perspective view showing the card connector shown in FIG. 1 without a cover.
Figure 3:
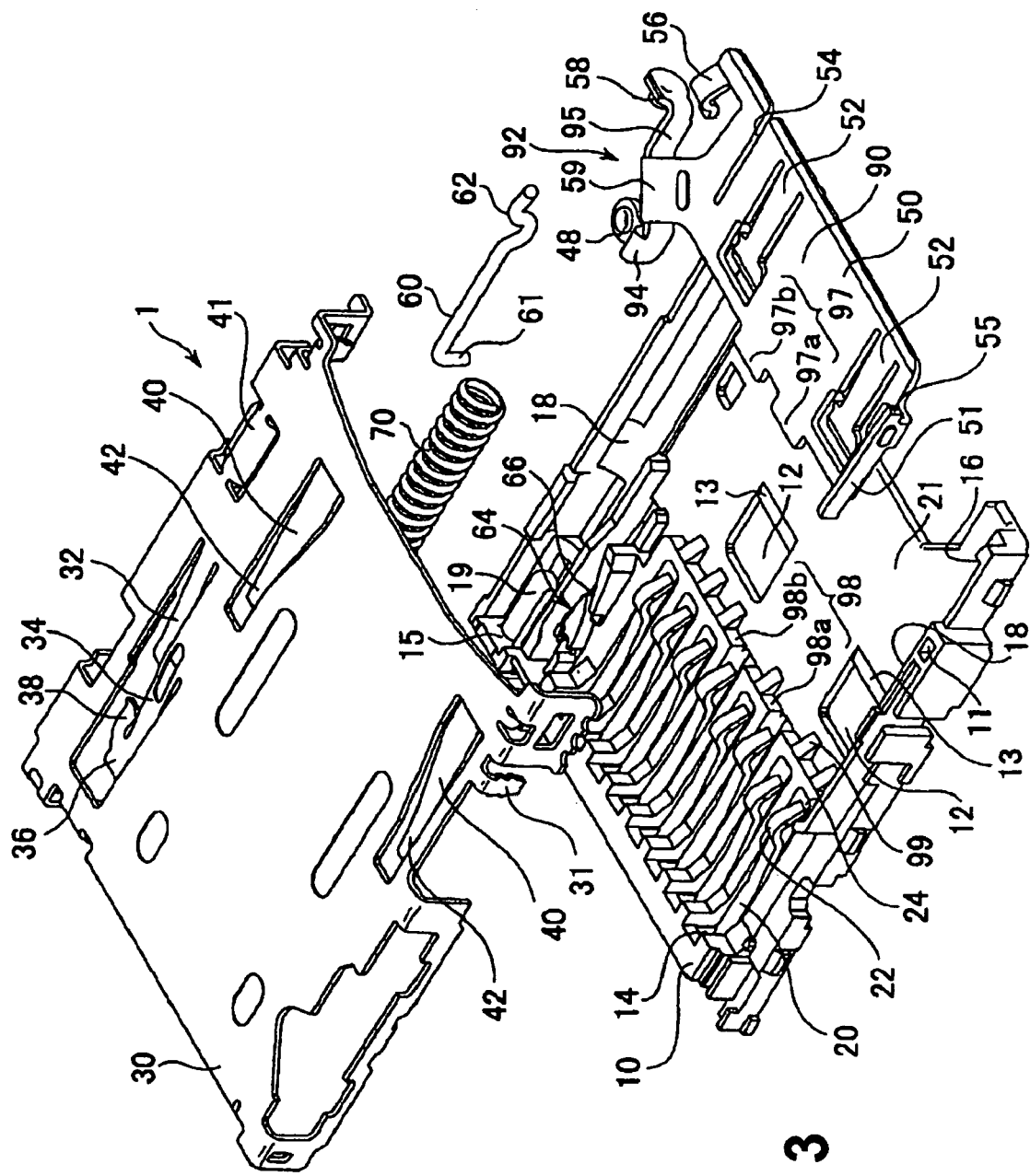
FIG. 3 is an exploded perspective view showing the card connector shown in FIG. 1.

FIG. 1 is a perspective view showing a card connector 1 according to the embodiment of the present invention. FIG. 2 is a perspective view showing the card connector 1 shown in FIG. 1 without a cover. FIG. 3 is an exploded perspective view showing the card connector 1 shown in FIG. 1. FIGS. 4(a) and 4(b) are plan views showing the card connector 1 when a card 3 is inserted therein.

As shown in FIGS. 4(a) and 4(b), a card 3 has an inclined surface 89 having a width decreasing toward an insertion direction of the card 3 at a middle of a side surface 87 thereof in a width direction thereof (between the side surface 87 and a side surface 88). In the present invention, the card 3 may include a mini SD card and a micro SD card. In the embodiment, a micro SD card is used as an example.

As shown in FIGS. 1 to 3, the card connector 1 includes a housing 10 made of an insulating material such as a resin; terminals 20 disposed in the housing 10; an ejector 50; a pin 60; a spring 70; and a cover 30 made of metal for covering an upper portion of the housing 10. After main components are assembled in the housing 10, the cover 30 is attached to the housing 10 from above, thereby assembling the card connector 1 having an opening portion at a rear side thereof for inserting the card 3. A fitted-in portion 31 provided on a sidewall of the cover 30 is fitted into a hole 11 formed in the housing 10, so that the cover 30 is attached to the housing 10.

A semi-circular portion 41 may be provided in the cover 30 by bending a pair of pieces extending opposite directions for corresponding to a shape of the spring 70, so that the cover 30 strongly holds the spring 70.

A plurality of terminal fixing holes 14 is formed in a front surface of the housing 10 for accommodating the terminals 20. Each of the terminals 20 is inserted from a front side of the housing 10 and fixed to corresponding one of the terminal fixing holes 14. When the card 3 is inserted into the card connector 1, corresponding terminal portions (not shown) formed on a bottom surface of the card 3 contact with terminal contacts 22 formed at distal ends of the terminals 20. When the terminal portions of the card 3 contact with the terminal contacts 22, the terminal contacts 20 deform downwardly along terminal grooves 24 for a specific amount.

The ejector 50 is made of metal and disposed inside the housing 10 at a rear side thereof. Inside the housing 10, the ejector 50 abuts against at least one of inner walls 18 of the housing 10, and is held away from a bottom surface 21 of the housing 10. In a state that the card 3 is placed on the ejector 50, the ejector 50 is capable of sliding inside the housing 10 in a direction that the card 3 is inserted and pulled out.

The ejector 50 has a size in a sliding direction (direction that the card 3 is inserted and pulled out) smaller than a whole length of the card 3. For example, the ejector 50 may have a size large enough for supporting just an intermediate portion of the card 3. Accordingly, it is possible to reduce a size of the ejector 50.

Figure 4:
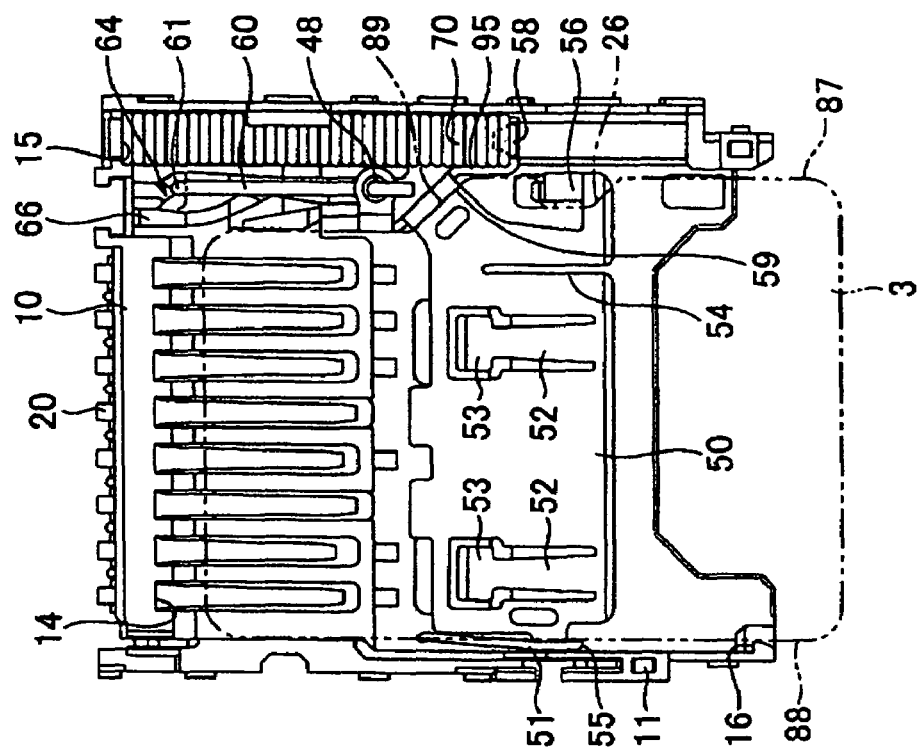
FIGS. 4(a) and 4(b) are plan views showing the card connector when a card is inserted therein.
Figure 4:
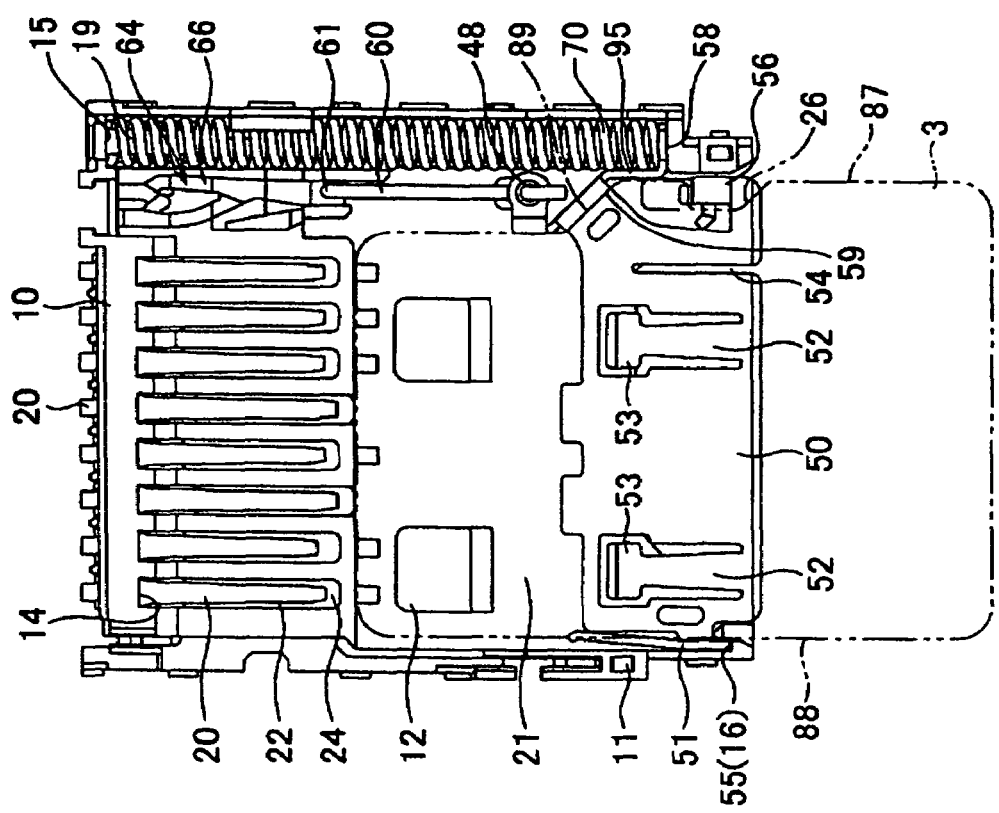

The ejector 50 slides between a pulled-out position shown in FIG. 4(*a*) and a locked position shown in FIG. 4(*b*). As shown in FIG. 4(*a*), at the pulled-out position, the card 3 is simply placed on the ejector 50 just before the card 3 is pulled out from the housing 10. In this state, the card 3 is disconnected from the terminals 20. As shown in FIG. 4(*b*), at the locked position, the card 3 returns slightly after the card 3 is forcefully pushed into the housing 10. In this state, the card 3 is locked at a specific position and connected to the terminals 20.

In the embodiment, the ejector 50 is formed through punching out and bending a single thin metal plate. Alternatively, the ejector 50 may be formed through connecting separately formed members. The ejector 50 includes a plate portion 90 and a pair of sidewalls 51 and 92 extending from both side surfaces of the plate portion 90 in a width direction toward the bottom surface 21 of the housing 10.

The plate portion 90 is formed of a plate member extending in the width direction of the card 3 or a width direction of the housing 10 corresponding to a surface of the card 3 for placing the card 3. A pair of the sidewalls 51 and 92 is arranged to hold the card 3 placed on the plate portion 90 from both sides in the width direction. A pair of the sidewalls 51 and 92 elastically holds the card 3 at a specific position on the ejector 50. Accordingly, it is possible to reduce a size of the ejector 50 and smoothly eject the card 3. The sidewalls 51 and 92 have a plate shape, and may be formed of pins.

The sidewall 92 includes a card contacting portion 59, a front extended surface 94 extending from the card contacting portion 59 toward the card insertion direction, and a rear extended surface (plate wall portion) 95. The card contacting portion 59 includes an inclined surface inclined (relative to the slide direction of the ejector 50) toward the card insertion direction, so that a width decreases corresponding to the shape of the card 3. The inclined surface is arranged in parallel to the inclined surface of the card 3.

The front extended surface 94 and the rear extended surface 95 are arranged in parallel at the insertion side and the pulled out side of the card 3 along the direction that the card 3 is inserted and pulled out with the card contacting portion 59 in between, respectively. With the front extended surface 94 and the rear extended surface 95, it is possible to securely restrict the side surface of the card 3. The card contacting portion 59, the front extended surface 94, and the rear extended surface 95 may be disposed at a plurality of positions according to the shape of the card 3.

The front extended surface 94 and the rear extended surface 95 are formed through bending distal ends of the card contacting portion 59, respectively. The front extended surface 94 and the rear extended surface 95 may be formed of separate members extending from the plate portion 90.

A spring contacting portion 58 is preferably arranged to protrude sideway from an end of the rear extended surface 95 for receiving the spring 70. With the configuration, it is possible to increase a distance between the spring contacting portion 58 and a front portion of the ejector 50. Accordingly, it is possible to obtain a sufficient length of the spring 70, or dispose a component such as a hart cam mechanism in the space. An inner side of the rear extended surface 95 restricts the side surface of the card 3, and an outer side thereof restrict the spring 70.

As shown in FIG. 3, the sidewall 51 is curved toward the card contacting portion 59, so that a distance between the sidewall 51 and the card contacting portion 59 decreases toward the front side of the card connector 1 along the direction that the card 3 is inserted and pulled out. The sidewall 51 is capable of elastically deforming in a horizontal direction (width direction). With the elasticity, it is possible to press the card 3 against the sidewall 91, thereby securely holding the card 3 between the sidewalls 51 and 92.

The sidewall 51 is provided with a rib having a convex shape at a side facing one of the inner walls 18, so that the ejector 50 slides smoothly. When the card 3 is placed on the ejector 50, the card 3 is situated and held between the card contacting portion 59, the rear extended surface 95, and the sidewall 51, thereby preventing the card 3 from jumping out.

A stopper 97 is provided in the plate portion 90 of the ejector 50 at a front middle portion thereof for restricting a sliding amount of the ejector 50. The stopper portion 97 includes stopper portions 97*a* and 97*b* corresponding to stopper walls 98*a* and 98*b* formed on the housing 10. When the ejector 50 slides forward in the housing 10, the stopper portions 97*a* and 97*b* abut against the stopper walls 98*a* and 98*b*, so that the ejector 50 does not move further in the housing 10.

When the ejector 50 slides forward in the housing 10, the card 3 placed on the ejector 50 is shifted upwardly with tapered portions 99 provided on the housing 10 at positions including both sides of the stopper walls 98*a* and 98*b* for guiding the card 3. Accordingly, the card 3 does not hit the stopper walls 98a and 98b. The tapered portions 99 are disposed at positions other than positions corresponding to the stopper portions 97a and 97b.

A rear edge surface 55 is disposed on the ejector 50 at one side thereof in the width direction for abutting against an inner protruding surface 16 disposed on the housing 10 at one side thereof in the width direction. A backside of the spring contacting portion 58 is also capable of abutting against the inner protruding surface 16. The pin 60 engages a cam groove 66. Accordingly, the ejector 50 is restricted in moving inside the housing 10 toward the rear side thereof and coming off from the housing 10.

The spring contacting portion 58 is disposed on the ejector 50 at the other side thereof in the width direction for abutting against a rear surface of the spring 70 disposed on the housing 10 at the other side thereof in the width direction. As described above, the pin 60 engages the cam groove 66. Further, the stopper portions 97a and 97b are disposed for abutting against the stopper walls 98a and 98b. Accordingly, the ejector 50 is restricted in moving inside the housing 10 toward the front side thereof.

A front surface of the spring 70 abuts against a front inner wall 15 of the housing 10 in a state that a supporting shaft 19 is inserted into the spring 70. Accordingly, the spring contacting portion 58 receives an elastic force of the spring 70, so that the ejector 50 is always urged toward the rear side of the housing 10, that is, in the direction that the card 3 is pulled out from the card connector 1.

When the card 3 is inserted into the card connector 1, the ejector 50 positions and engages the card 3 at a center position thereof. For the positioning, the card 3 is provided with an inclined surface 89 having a width increasing from a front side toward a rear side at one side thereof in the width direction. The card contacting portion 59 of the ejector 50 is provided with an inclined surface corresponding to the inclined surface 89.

A recess portion 26 recessed inwardly in the width direction is formed in the card 3 at a position closer to a card insertion side relative to the inclined surface 89 for the positioning and engagement. A card engaging portion 56 is provided in the ejector 50 for engaging the recess portion 26. The card engaging portion 56 is formed of a part of the plate portion 90 at one side in the width direction of the ejector 50 at a pulled out side of the card 3 along the direction that the card 3 is inserted and pulled out. The card engaging portion 56 has a bent top portion to form a substantially right-angle triangle shape having a steep slope from a front side to a rear side (from the pulled out side of the card 3 to the insertion side thereof). The card engaging portion 56 elastically protrudes downwardly below the bottom surface of the ejector 50 and is arranged to be capable of deforming.

When the card 3 is inserted into the card connector 1, the card engaging portion 56 abuts against the card 3, so that the card engaging portion 56 is shifted in a direction perpendicular to the direction that the card 3 is inserted and pulled out and the width direction of the card 3. Accordingly, the card engaging portion 56 allows the card 3 to be inserted, and engages the recess portion 26 of the card 3 when the card engaging portion 56 reaches the same.

When the card 3 is inserted into the card connector 1, the inclined surface 89 of the card 3 proceeds inside the housing 10 while pushing the card engaging portion 56 to elastically deform downwardly. When the recess portion 26 reaches the card engaging portion 56, the card engaging portion 56 returns to an original state before the elastic deformation to snap-fit in the inclined surface 25. In this state, the inclined surface 89 of the card 3 abuts against the card contacting portion 59 through elasticity of the sidewall 51. As a result, the card 3 lightly engages and is set at a specific position on the ejector 50.

When the card 3 is pulled toward the rear side of the card connector 1 with a specific force, the card 3 is disengaged from the card engaging portion 56. In the embodiment, a cut portion 54 may be formed at a side portion of the card engaging portion 56 along the direction that the ejector 50 slides, so that the card 3 efficiently engages and the card engaging portion 56 smoothly deforms. With the cut portion, it is possible to deform the plate portion 90 of the ejector 50 in the vertical direction, thereby easily deforming the card engaging portion 56.

When the card 3 engages the card engaging portion 56 and is sandwiched with the sidewalls 51 and 92, it is possible to prevent the card 3 from jumping out from the card connector 1 when the card 3 is pulled out from the card connector 1 in a normal pushing operation. In a conventional card connector, a card pressing spring is disposed on a cover for pressing a card downwardly from one side or from above, thereby preventing the card from jumping out. In the embodiment, the card connector 1 is provided with pressing springs 40. The pressing springs 40 are formed of cut portions formed in parts of an upper plate of the cover 30. The cut portions have free ends extending in the direction that the card 3 is inserted into the card connector 1, and the free ends are bent downwardly toward the front side of the card connector 1 to form the pressing springs 40.

When the spring 70 has a strong force, it is difficult to completely prevent the card 3 from jumping out with the pressing springs 40 and the engagement described above. Accordingly, it is necessary to adjust the force of the spring 70, thereby making it possible to securely prevent the card 3 from jumping out. In the embodiment, jumping prevention springs 52 formed of elastic pieces are formed in the bottom surface of the ejector 50 to protrude. Escape spaces 12 are formed in the bottom surface 21 of the housing 10, so that elastic portions, especially distal end portions 53, of the jumping prevention springs 52 can freely deform in the escape spaces 12. With the configuration described above, it is possible to adjust the force of the spring 70.

A pin fixing hole 48 is provided in the ejector 50 at a front side position thereof in a flat plate piece extending from the front extended surface 94 one side in the width direction of the ejector 50 for engaging the pin 60 in a state that an ejector fixing portion 62 of the pin 60 hooks the pin fixing hole 48. The pin 60 engages the pin fixing hole 48 in the flat plate piece in parallel to the moving surface of the ejector 50, so that the pin 60 moves inside the housing 10 together with the ejector 50. Accordingly, a hart cam engaging portion 61 extending from a distal end portion of the pin 60 at a right angle slides along the cam groove 66 of a hart cam mechanism 64 formed along the direction that the card 3 is inserted and pulled out.

The pin fixing hole 48 is formed in a space between the front extended surface 94 and the rear extended surface 95. Accordingly, it is possible to use the space between the front extended surface 94 and the rear extended surface 95 for sliding the pin 60, thereby making it possible to reduce a size. The cam groove 66 has a hart shape surrounding a hart-shaped island portion 67 disposed at a center of the hart cam mechanism 64.

The disclosure of Japanese Patent Application No. 2005-232123, filed on Aug. 10, 2005, is incorporated in the application.

While the invention has been explained with reference to the specific embodiments of the invention, the explanation is illustrative and the invention is limited only by the appended claims.

What is claimed is:

1. A card connector for inserting a card having a first inclined surface, comprising:
   a housing for accommodating the card;
   a terminal for contacting with the card when the card is inserted into the housing;
   an ejection unit for placing the card and capable of sliding in the housing in a first direction that the card is inserted into the housing and a second direction that the card is pulled out from the housing, said ejection unit including a front portion and a rear portion such that the ejection unit slides in the first direction with the front portion thereof ahead, said ejection unit including a plate portion and a pair of sidewalls extending from the plate portion, said sidewalls sandwiching the card from both sides thereof when the card is placed on the plate portion, at least one of said sidewalls including a second inclined surface corresponding to the first inclined surface; and
   a spring member for urging the ejection unit in the second direction.

2. The card connector according to claim 1, wherein the other of said sidewalls includes an elastic member for pressing the card against the one of the sidewalls.

3. The card connector according to claim 1, wherein said one of the sidewalls further includes an extended surface extending in at least one of the first direction and the second direction.

4. The card connector according to claim 3, wherein said extended surface includes a first extended surface and a second extended surface arranged in parallel adjacent to the front portion and the rear portion, respectively, along the first direction and the second direction with the second inclined surface in between.

5. The card connector according to claim 4, wherein said first extended surface includes an abutting portion abutting against the spring member.

6. The card connector according to claim 1, further comprising an elastic engaging member provided on the plate portion so that the card pushes the elastic engaging member to deform in a direction perpendicular to the first and second directions and a width direction of the card when the card is inserted into the card connector.

7. The card connector according to claim 6, wherein said plate portion includes a cut portion provided adjacent to the elastic engaging member.

* * * * *